US007237246B2

(12) United States Patent
Chang

(10) Patent No.: US 7,237,246 B2
(45) Date of Patent: Jun. 26, 2007

(54) POSITION ADJUSTMENT AND DAMPER MECHANISM FOR AN OPTICAL DISK DRIVE

(75) Inventor: Yen-Jen Chang, Kao-Hsiung (TW)

(73) Assignee: BanQ Corporation, Tao-Yuan Hsien (TW)

( * ) Notice: Subject to any disclaimer, the term of this patent is extended or adjusted under 35 U.S.C. 154(b) by 580 days.

(21) Appl. No.: 10/605,650

(22) Filed: Oct. 15, 2003

(65) Prior Publication Data

US 2004/0199930 A1 Oct. 7, 2004

(30) Foreign Application Priority Data

Apr. 7, 2003 (TW) .............................. 92107929 A

(51) Int. Cl.
*G11B 33/08* (2006.01)

(52) U.S. Cl. ....................... 720/692; 720/698; 720/611

(58) Field of Classification Search ................ 720/692, 720/694, 698, 688, 697, 611
See application file for complete search history.

(56) References Cited

U.S. PATENT DOCUMENTS 4,325,131 A * 4/1982 Takeda ....................... 369/255
4,631,716 A * 12/1986 Ikedo et al. ................ 720/610
4,812,932 A * 3/1989 Hishinuma et al. ...... 360/97.01
5,008,873 A * 4/1991 Tanaka et al. ........... 369/44.14
5,131,619 A * 7/1992 Daugherty et al. ......... 248/635
6,005,836 A 12/1999 Choi
6,181,669 B1 * 1/2001 Park ........................... 720/697
6,249,504 B1 * 6/2001 Iwanaga ..................... 720/692
6,414,934 B1 * 7/2002 Akiba ........................ 720/675
6,792,614 B1 * 9/2004 Matsumura et al. ........ 720/700
6,993,780 B2 * 1/2006 Inatani et al. ............... 720/697
7,120,920 B1 * 10/2006 Maeda ....................... 720/692
2002/0176350 A1 * 11/2002 Kadowaki et al. .......... 369/263
2004/0163096 A1 * 8/2004 Lin et al. .................... 720/692

FOREIGN PATENT DOCUMENTS

CN 1075654 C 11/2001

* cited by examiner

*Primary Examiner*—Brian E. Miller
(74) *Attorney, Agent, or Firm*—Winston Hsu

(57) ABSTRACT

A position adjustment method includes forming a plurality of bores on a tray, forming a plurality of through holes in a mounting plate corresponding to the bores on the tray, installing a plurality of screws into the through holes, and threading a plurality of nuts onto the screws, so as to fasten the screws to the mounting plate. The method also includes threading the screws into the corresponding bores so as to fasten the mounting plate to the tray and adjusting depths of the screws in the bores so as to adjust the position of the mounting plate relative to the tray.

4 Claims, 15 Drawing Sheets

Predetermined clearance
36
86
94
38
84
$d_1$
$d_2$ 34
36
12
40
40
38
32
28

POSITION ADJUSTMENT AND DAMPER MECHANISM FOR AN OPTICAL DISK DRIVE

BACKGROUND OF INVENTION

1. Field of the Invention

The invention relates to a position adjustment mechanism and a method thereof, and more particularly, to a mechanism and method for adjusting the position of a mounting plate relative to the tray of an optical disk drive.

2. Description of the Prior Art

In recent years, personal computers have changed from calculation oriented to multimedia oriented. Therefore storage devices for storing a big amount of video information are improved continuously. An optical disk drive that can read and write information to optical disk has become a mainstream product in the market. A pickup head of the optical disk drive emits laser beams with specific wavelengths and power to read information stored in the optical disk or write information into the optical disk. In specification, the main products of optical disk are compact disks (CD) and digital versatile disks (DVD). The optical disks also can be divided into read-only optical disks, write-once optical disks, and rewritable optical disks in application. The optical disk drives can also be divided into video disk players and CD burners.

FIG. 1 is a schematic diagram of a main body 10 of an optical disk drive according to the prior art. The main body 10 comprises a mounting plate 12, a spindle motor 14 positioned on the mounting plate 12 for providing a motive power to rotate an optical disk put on the spindle motor 14, a main guide bar 16 and a sub guide bar 18 positioned in opposite side on the mounting plate 12, and a pickup head 20 connected to the main guide bar 16 and the sub guide bar 18 by a sliding way along the direction of the main guide bar 16 and the sub guide bar 18 to read or write information to the optical disk. Following is the description of the operation method of the optical disk drive by explaining the theory of reading information manner.

When the optical disk drive is going to read information of a specific track on the optical disk, the pickup head 20 will slide along the direction of the main guide bar 16 and the sub guide bar 18 to a corresponding position and emit laser beams having a wavelength, with the spindle motor 14 rotating, to read the information from the specific track. However, an inaccuracy may occur during fabricating the optical disk drive, so that the two ends of the main guide bar 16 and the sub guide bar 18 will have different heights. As a result, the distance between the pickup head 20 and the surface of the optical disk will be indefinite when the pickup head 20 slides along the main guide bar 16 and the sub guide bar 18. The indefinite distance results in that the emission power of the pickup head 20 is hardly controlled, even in errors or failures of reading information.

Referring to FIGS. 2 and 3, FIG. 2 is a schematic diagram of a reverse side of the main body 10 shown in FIG. 1, wherein an optical disk is positioned on the spindle motor 14, and FIG. 3 is a section view of the main body 10 shown in FIG. 2. In FIG. 3, assuming that the two ends of the main guide bar 16 and the sub guide bar 18 have different heights, there is an angle $\theta_1$ between the sliding direction of the pickup head 20 (the dual-arrow 26) and the horizontal surface of the optical disk. As shown in FIG. 3, the distance between the pickup head 20 and the surface of the optical disk as the pickup head 20 slides to a position close to the spindle motor 14 is different from the distance as the pickup head 20 slides to a position far away from the spindle motor 14.

In the prior art, to solve the problem resulting from the indefinite distance between the pickup head 20 and the optical disk, a plurality of height adjusting mechanisms are installed on the ends of the main guide bar 16 and the sub guide bar 18, such as three tuning screws 22 in FIG. 1. After the main body 10 of the optical disk drive is assembled, those tuning screws 22 will be adjusted individually according to the different heights of the main guide bar 16 and the sub guide bar 18 to insure that the directions of both of the main guide bar 16 and the sub guide bar 18 are parallel with the surface of the optical disk so as to prevent the problem of the indefinite distance between the optical disk surface and the pickup head 20.

However, the inaccuracy occurred during the fabrication and assembling process of the optical disk drive not only results in the angle $\theta_1$ between the sliding direction of the pickup head 20 and the surface of the optical disk, but also results in other problems when the main body 10 is further assembled to a tray of the optical disk drive. Please refer to FIG. 4. FIG. 4 is a schematic diagram of the tray 28 of the optical disk drive. The main body 10 is assembled onto the tray 28. The assembling method is to install a plurality of screws through the dampers 24 (such as rubber pads) and corresponding through holes, to thread nuts onto the screws, and to thread the screws into the corresponding bores 30 on the tray 28 so as to fasten the mounting plate 12 to the tray 28, as shown in FIG. 5, which is a schematic diagram of the assembled main body 10 and the tray 28.

Please refer to FIGS. 6 and 7. FIG. 6 is a schematic diagram in a reverse side of the main body 10 and the tray 28 shown in FIG. 5 wherein the optical disk is positioned on the spindle motor 14. FIG. 7 is a section view of the main body 10 and the tray 28 shown in FIG. 6. Another problem resulting from the inaccuracy of the assembling process is that an error angle between the main body 10 (including the mounting plate 12 and the spindle motor 14) and the tray 28 occurs. It results in an angle $\theta_2$ between the surface of the optical disk located on the spindle motor 14 and the tray 28, which causes the outer portion of the optical disk to collide with the tray 28 when the optical disk rotates. The above-mentioned problem is especially serious in thin-type optical disk drives of common notebook computers because the space in a thin-type optical disk drive is especially small.

SUMMARY OF INVENTION

It is therefore a primary objective of the claimed invention to provide a position adjustment method for adjusting the position of a mounting plate relative to the tray of an optical disk drive to solve the above-mentioned problem.

According to the claimed invention, a position adjustment method is disclosed for adjusting the position of a mounting plate relative to the tray of an optical disk drive to prevent an optical disk mounted on the mounting plate from colliding with the tray. The method comprises the following steps: forming a plurality of bores on the tray, forming a plurality of through holes on the mounting plate corresponding to the bores, installing a plurality of screws into the through holes, threading a plurality of nuts onto the screws so as to fasten the screws to the mounting plate, threading the screws into the corresponding bores so as to fasten the mounting plate to the tray, and adjusting a depth of each of the screws in the bore so as to adjust the position of the mounting plate relative to the tray.

According to the claimed invention, a position adjustment mechanism is further disclosed for adjusting the position of a mounting plate with a plurality of through holes relative to a tray of an optical disk drive to prevent an optical disk mounted on the mounting plate from colliding with the tray. The position adjustment mechanism comprises a plurality of bores installed on the tray corresponding to the through holes on the mounting plate, a plurality of screws threaded into the bores through the corresponding through holes to fasten the mounting plate to the tray, and a plurality of nuts threaded onto the screws to fasten the screws to the mounting plate.

It is an advantage of the claimed invention that the position adjustment mechanism and method thereof introduce a theory to adjust the depth of each of the screws in the bore of the tray individually to correct the position of the mounting plate relative to the tray, so that the optical disk mounted on the mounting plate will not collide with the tray.

These and other objectives of the present invention will no doubt become obvious to those of ordinary skill in the art after reading the following detailed description of the preferred embodiment that is illustrated in the various figures and drawings.

DETAILED DESCRIPTION

Figure 8:
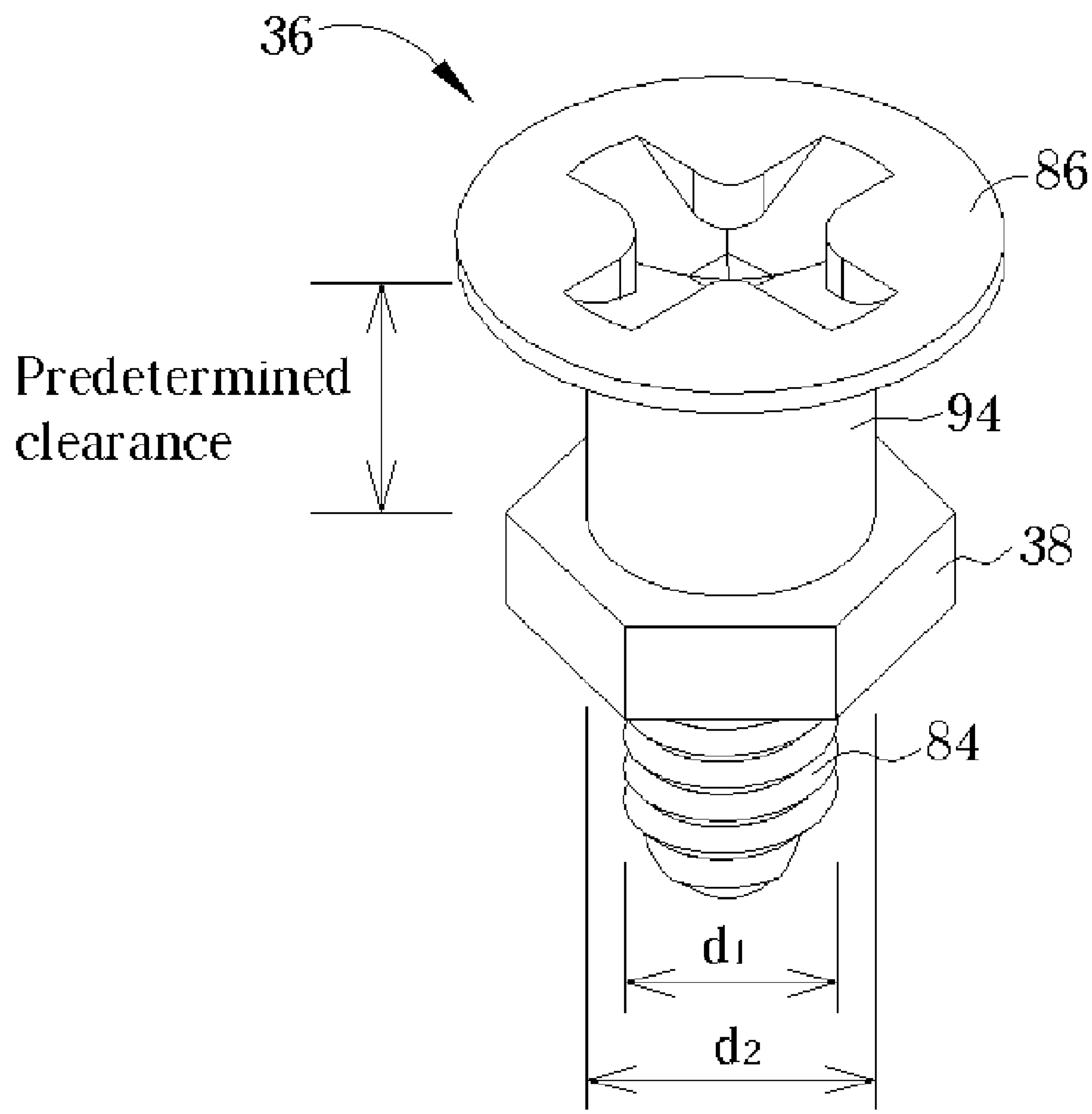
FIG. 8 is a screw and a nut of the position adjustment mechanism according to the present invention.

Please refer to FIG. 8. FIG. 8 is a screw 36 and a nut 38 of the position adjustment mechanism according to the present invention. The screw 36 comprises a shaft 84, a smooth portion 94, and a head 86. The shaft 84 is a threaded cylinder, and the shaft 84 has a diameter $d_1$ for accepting the nuts 38. The smooth portion 94 is a cylinder without screw threads and located between the shaft 84 and the head 86. The smooth portion 94 has a length of a predetermined clearance shown in FIG. 8, and the smooth portion 94 has a diameter $d_2$, which is greater than the diameter $d_1$. Therefore the nut 38 can only be threaded onto the shaft 84 of the screw 36 until it reach the interface of the shaft 84 and the smooth portion 94. As shown in FIG. 8, a predetermined clearance between the nut 38 and the head 86 occurs.

Figure 9:
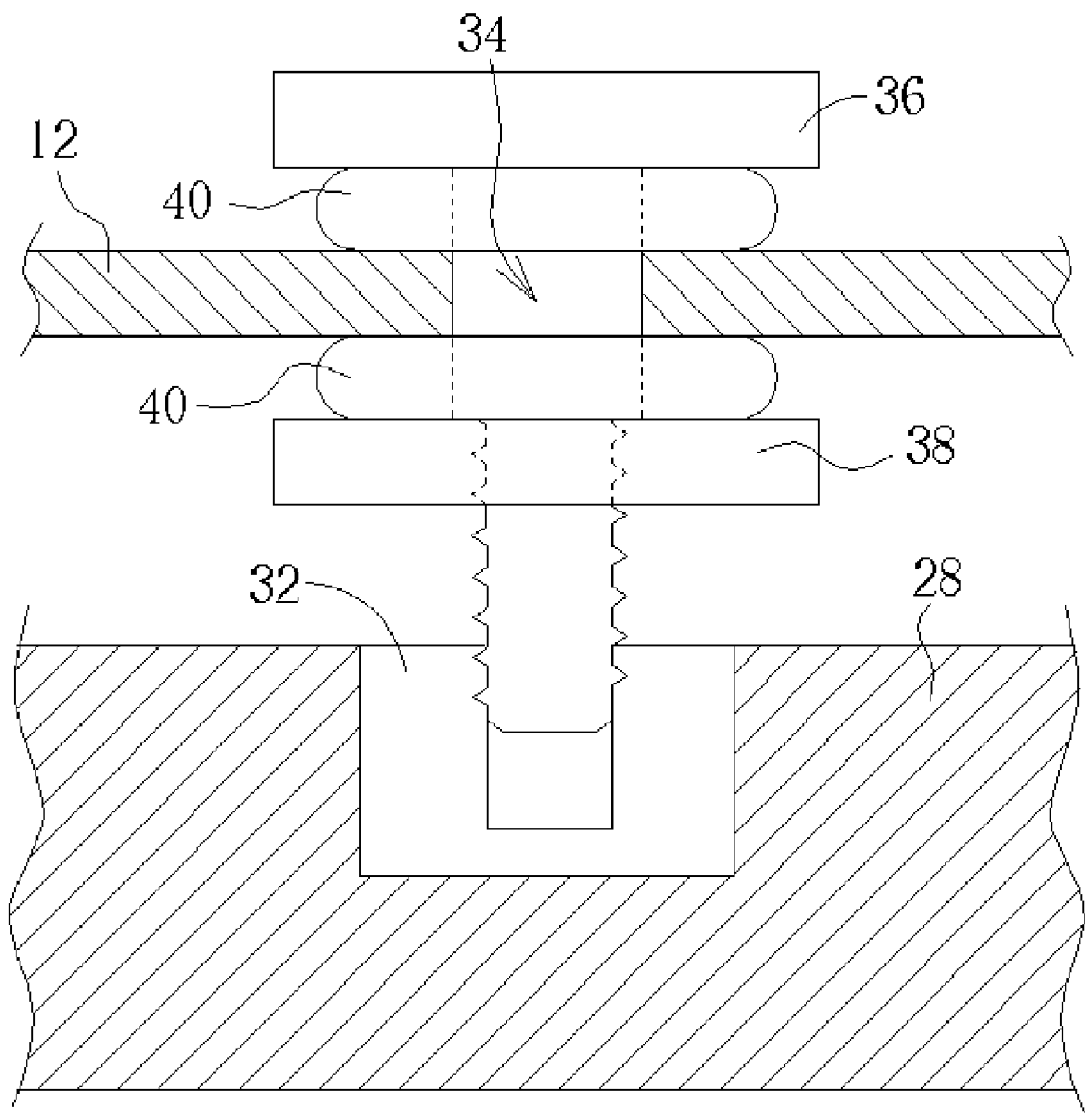
FIG. 9 is a schematic diagram of a preferable embodiment of the position adjustment mechanism according to the present invention.

Please refer to FIG. 9. FIG. 9 is a schematic diagram of a preferable embodiment of the position adjustment mehanism according to the present invention. The position adjustment mechanism comprises three sets of the adjustment movements shown in FIG. 9. Each of the adjustment movements includes a bore 32 on the tray 28 to provide a functionally of a bore for accepting the screw 36, a through hole 34 formed in the mounting plate 12 corresponding to the bore 32, a screw 36 threaeded into the bore 32 through the hole 34 to fasten the mounting plate 12 to the tray 28, and a nut 38 threaded onto the screw 36 to fasten the screw to the mounting plate 12.

It should be noticed that the bore 32 is a copper pillar, and the copper pillar can be a cylinder with an indent at the center of one face with screw threads on an inside wall of the indent, as shown in FIG. 9. Without contradiction to the spirit of the present invention, the copper pillar can also be a hollow cylinder 42 with screw threads 44 on an inside wall of the cylinder 42 as shown in FIG. 19. Furthermore, if need be, the adjustment movements in FIG. 9 can comprise two dampers 40 (such as rubber pads mentioned above) positioned between the mounting plate 12 and the nut 38, the head of the screw 36 and the mounting plate 12 to reduce the effect of shocks to the optical disk drive when it reads information. According to the design, the mounting plate 12 and the two dampers 40 are positioned just right in the predetermined clearance of the screw 36. In addition, both of the diameters of the head of the screw 36 and the nut 38 are greater than the diameter of the dampers 40 so that the dampers 40 can absorb shocks sufficiently.

Figure 11:
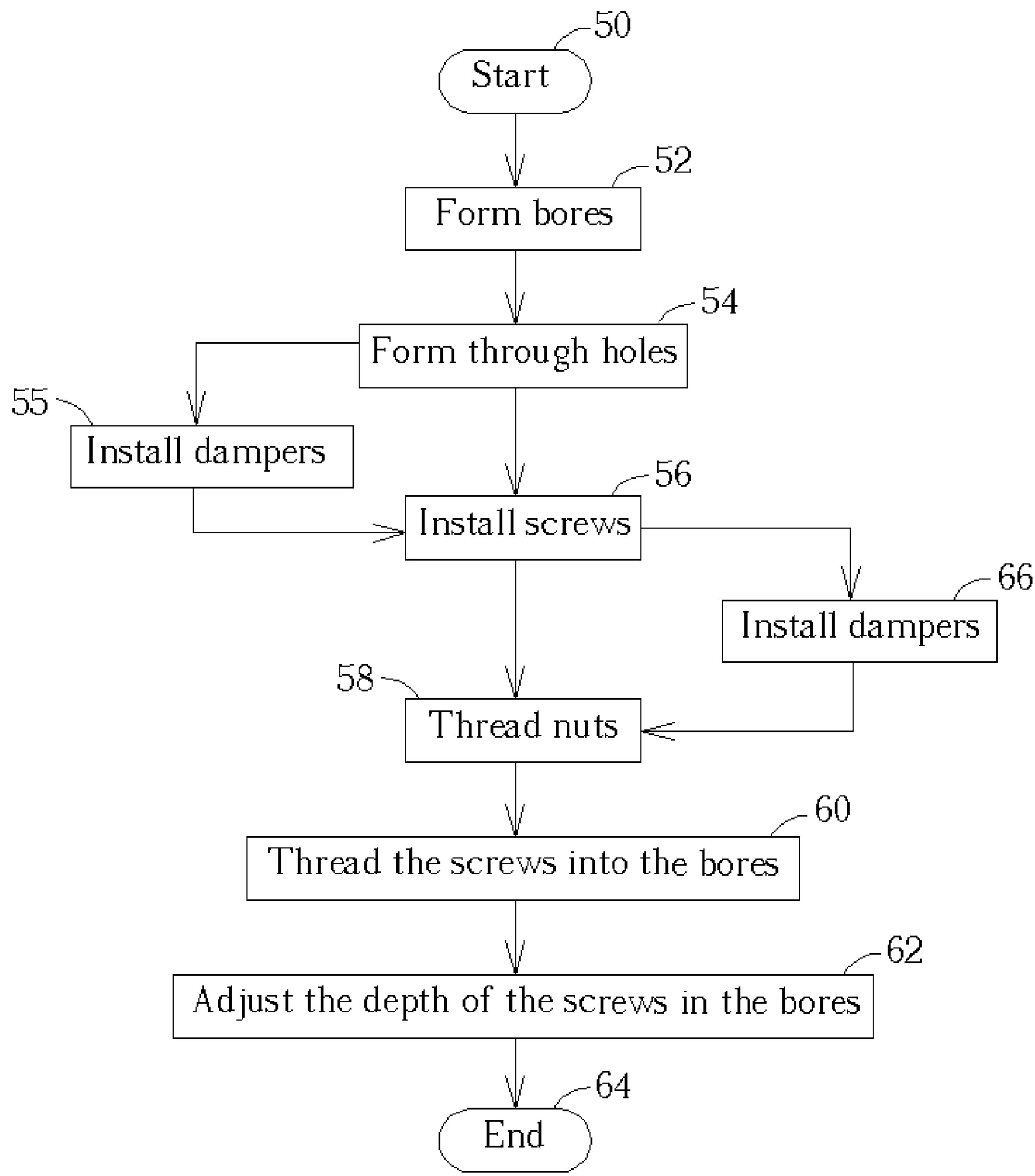
FIG. 11 is a flow chart of the position adjustment method according to the present invention by using a position adjustment mechanism shown in FIG. 8.

Please refer to FIG. 11, which is a flow chart of the position adjustment method according to the present invention by using a position adjustment mechanism shown in FIG. 9. The method comprises the following steps:

Step 50: Start;

Step 52: Form a plurality of bores 32 in the tray 28;

Step 54: Form a plurality of through holes 34 through the mounting plate 12 corresponding to the bores 32 in the tray 28;

Step 56: Install a plurality of screws 36 into the through holes 34;

Step 58: Thread a plurality of nuts 38 onto the screws 36 to fasten the screws 36 to the mounting plate 12;

Step 60: Thread the screws 36 into the bores 32 to fasten the mounting plate 12 to the tray 28;

Step 62: Adjust the depth of each of the screws 36 in the bore 32 individually so as to adjust the position of the mounting plate 12 relative to tray 28;

Step 64: End.

The above steps of the position adjustment method can effectively adjust the position of the mounting plate 12 relative to tray 28 so that the surface of the optical disk mounted on the mounting plate 12 is parallel with the surface of the tray 28 to prevent an optical disk on the mounting plate 12 from colliding with the tray 28. It should be noted that the locations of the bores 32 on the tray 28 and the locations of the through bores 34 on the mounting plate 12 are based on that the adjustment function can be reached. Therefore at least three sets of the adjustment movements shown in FIG. 8 are needed to be set on three points not located in a line on the mounting plate 12 and the tray 28 to define a surface. Furthermore, the bores 32 may be copper pillars with a threaded indent at center (as shown in FIG. 8) or hollow cylinders with screw threads on inside walls (as shown in FIG. 9). The step 52 further comprises installing the copper pillar into the tray 28.

In addition, steps 55 and 66 may be performed before steps 56 and 58 respectively. Step 55 is to install the dampers 40 onto the smooth portion of the screw 36, and step 66 is to install the dampers 40 between the mounting plate 12 and the nuts 38 for reducing the effect of shocks, as shown in FIG. 11.

Figure 4:
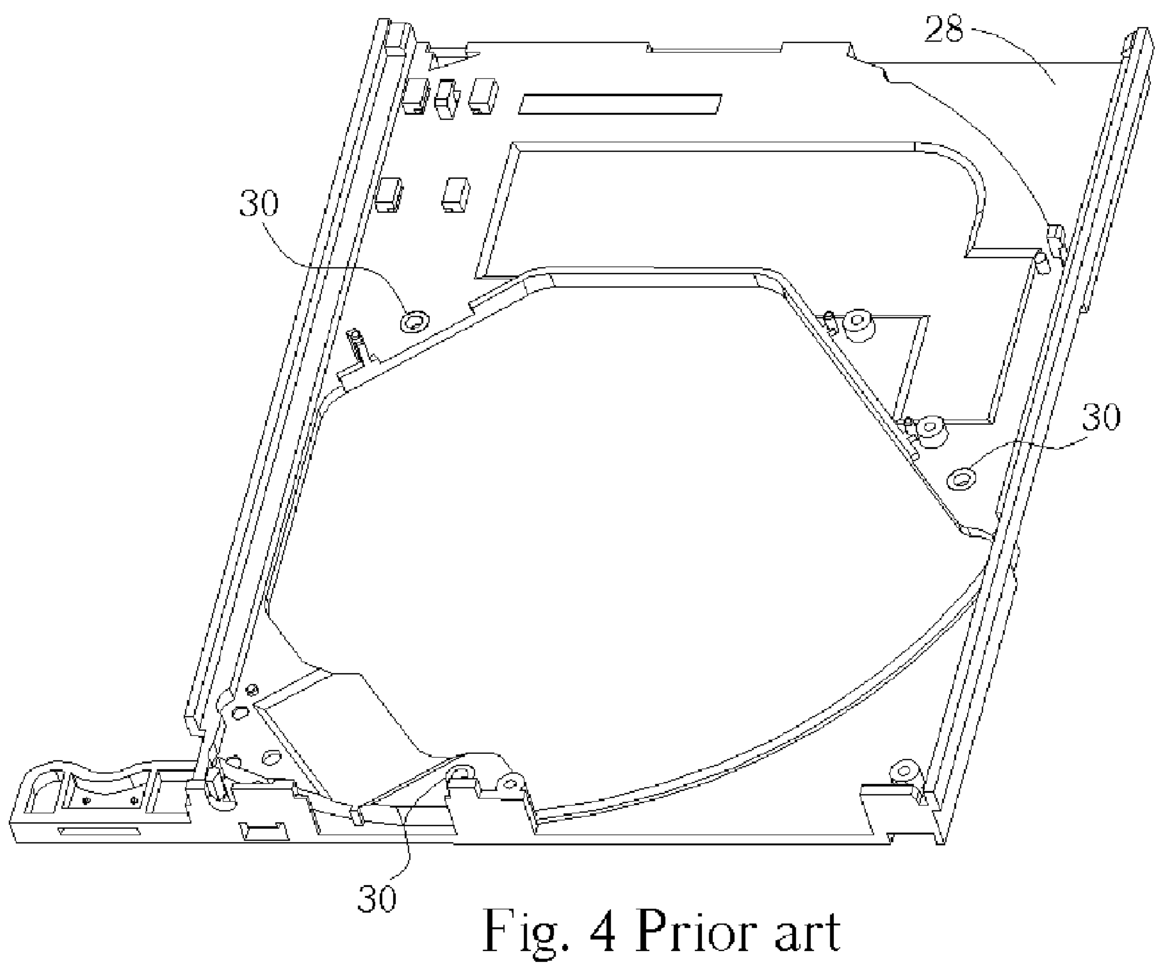
FIG. 4 is a schematic diagram of a tray of the optical disk drive.
Figure 5:
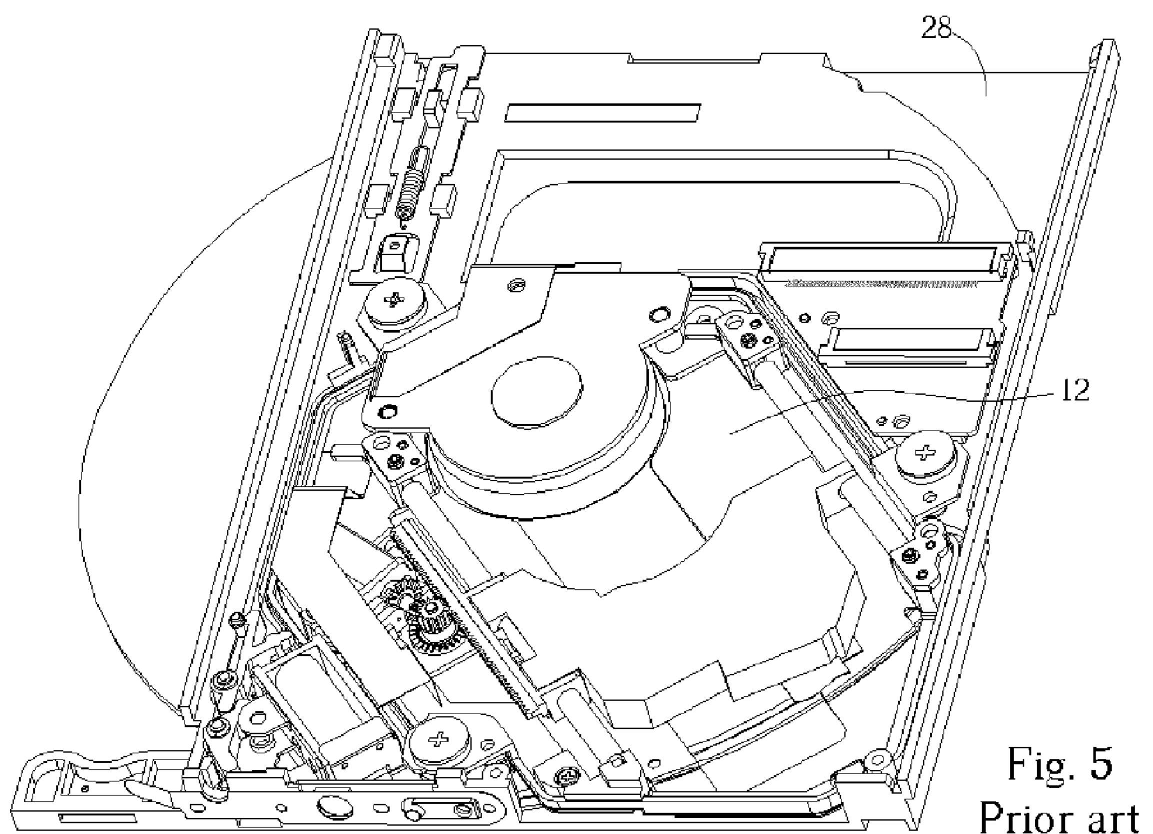
FIG. 5 is a schematic diagram of the assembled main body and the tray shown in FIG. 4.
Figure 6:
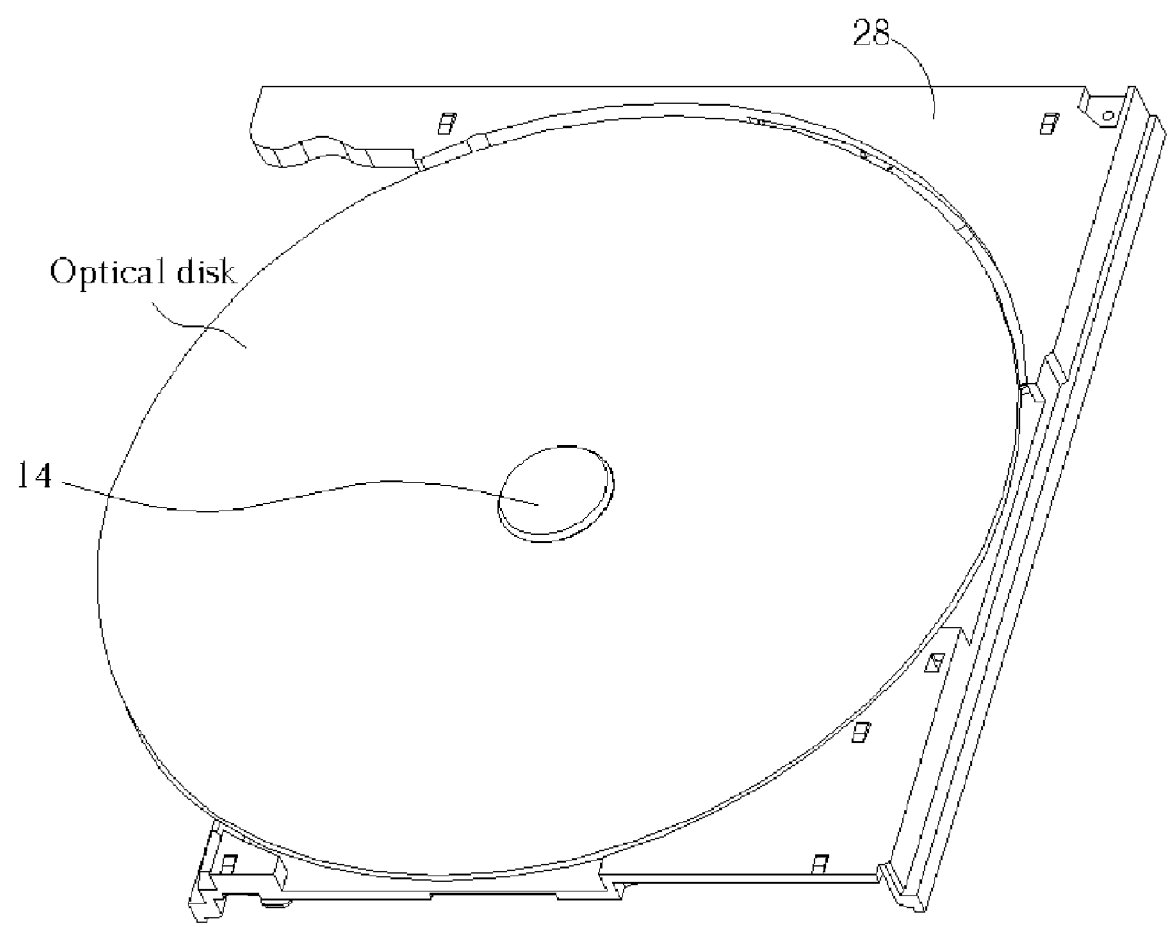
FIG. 6 is a schematic diagram in a reverse side of the main body and the tray shown in FIG. 5.
Figure 7:
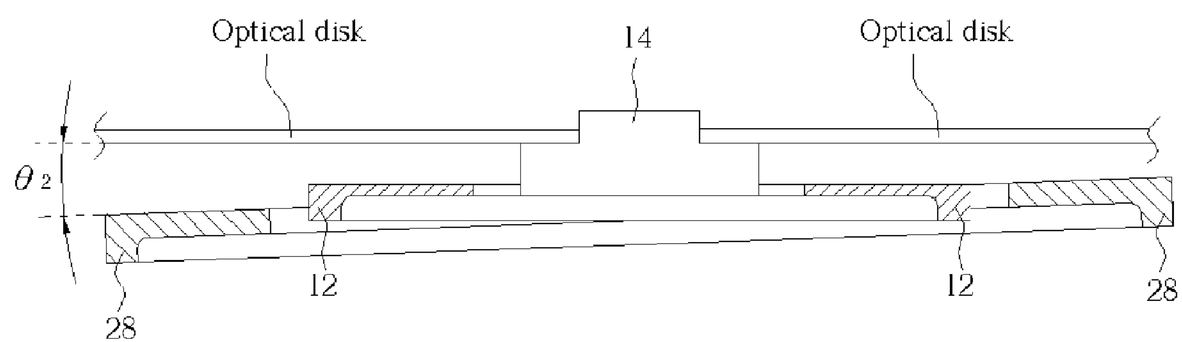
FIG. 7 is a section view of the main body and the tray shown in FIG. 6.

In a second preferable embodiment of the present invention, the dampers 24 and corresponding through bores in FIG. 11 and the bores 30 shown in FIG. 4 of the prior art may be adopted to carry out the position adjustment mechanism and method according to the present invention. It means that the through holes corresponding to the dampers 24 are taken as the through holes 34, and the bores 30 serve as the bores 32 of the present invention. Then the screws 36 and the nuts 38 are installed into the prior-art through holes and the bores 30 to complete the position adjustment mechanism according to the present invention. In addition, the dampers 24 can be taken as the dampers 40 of the present invention.

Figure 1:
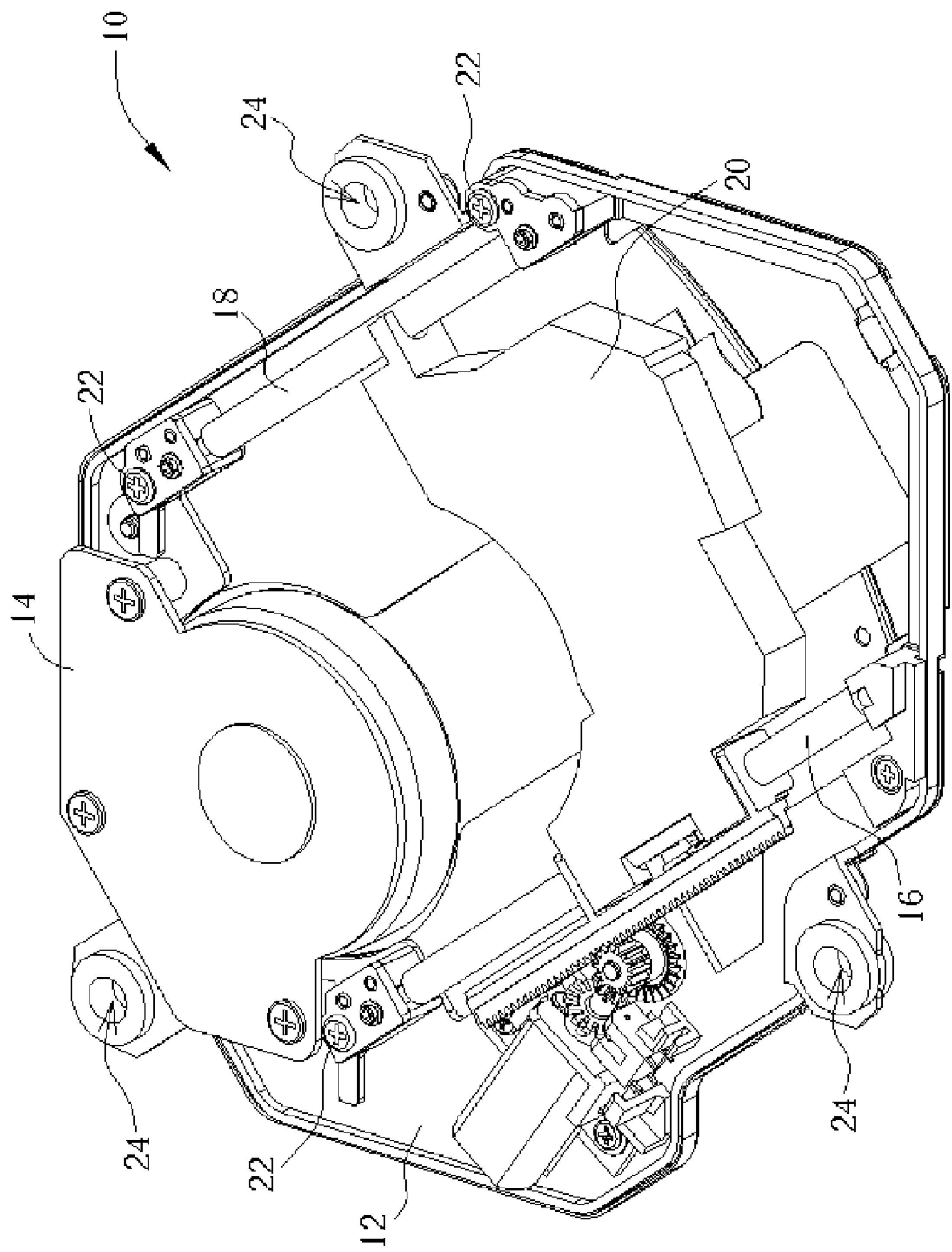
FIG. 1 is a schematic diagram of a main body of an optical disk drive according to the prior art.
Figure 2:
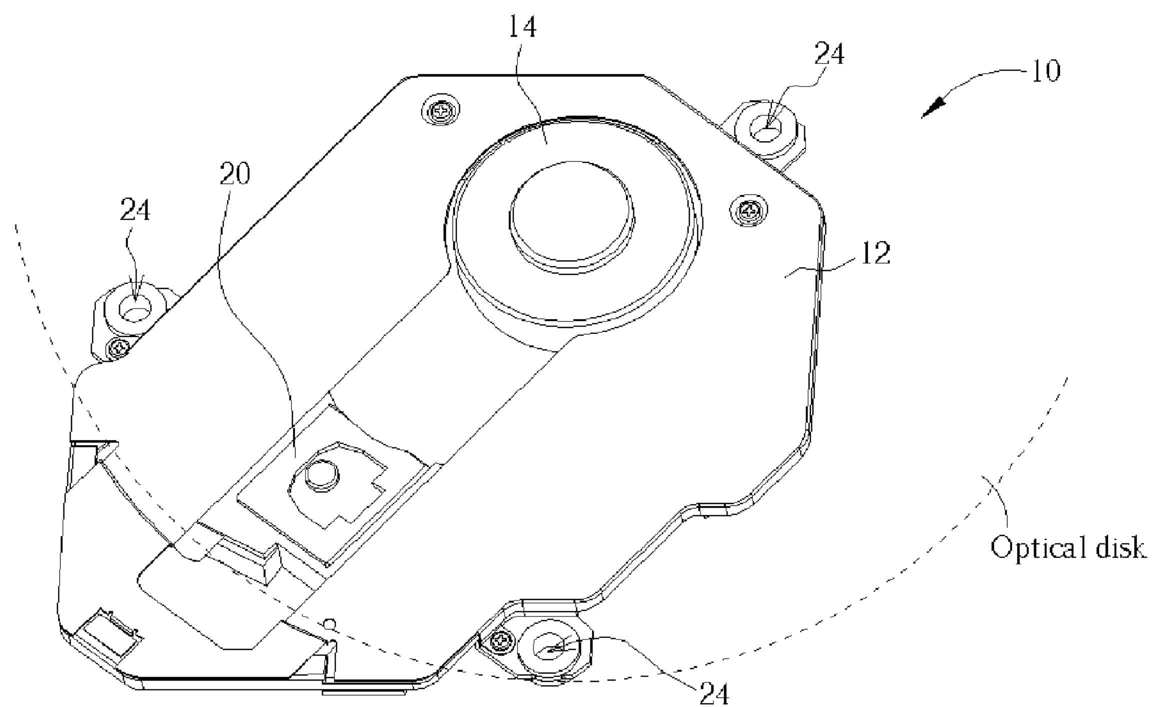
FIG. 2 is a schematic diagram of a reverse side of the main body shown in FIG. 1.
Figure 3:
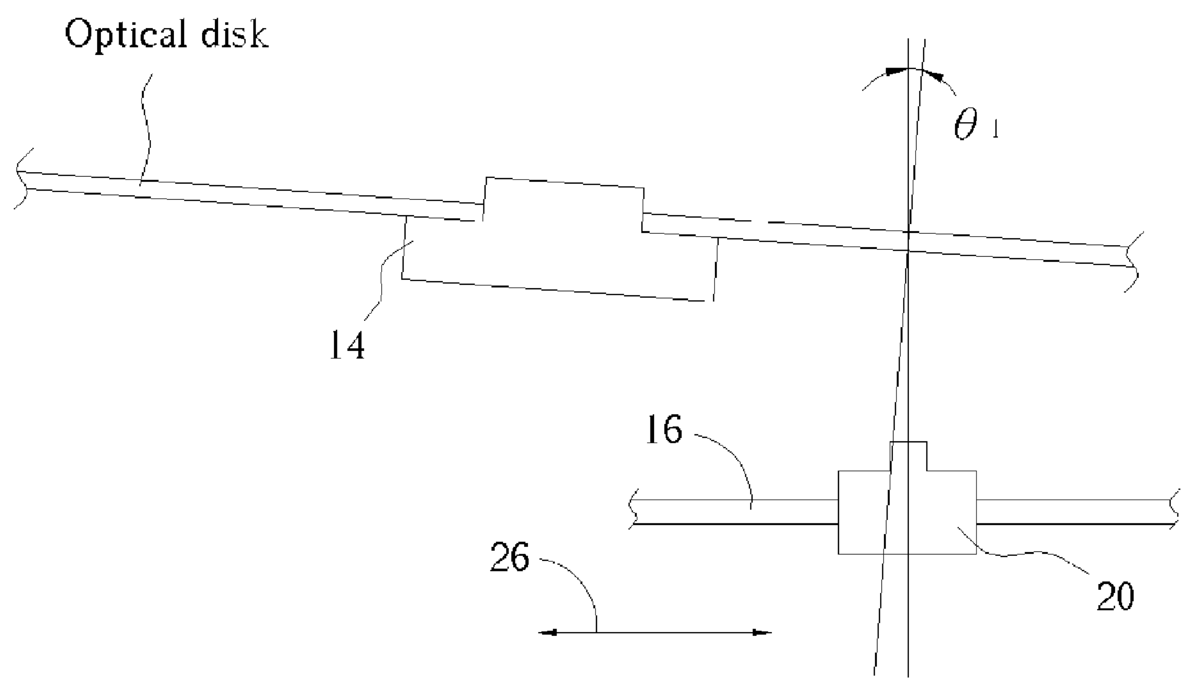
FIG. 3 is a section view of the main body shown in FIG. 2.
Figure 10:
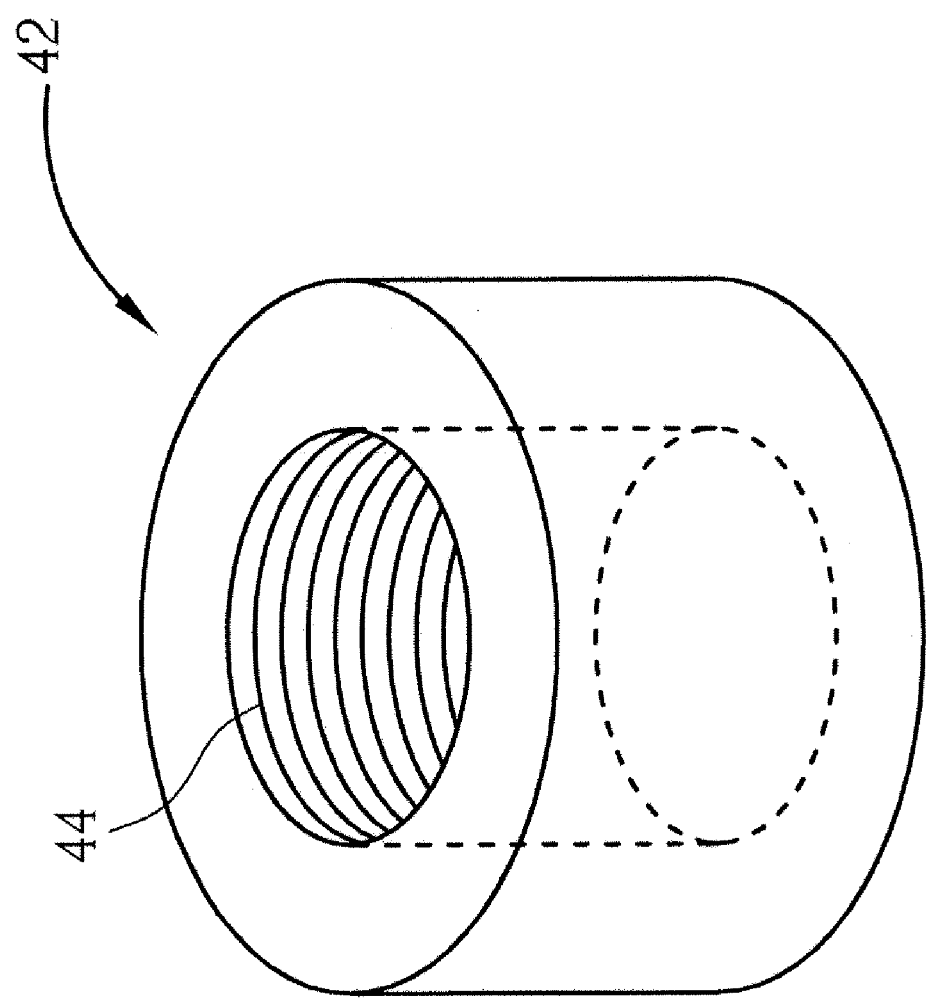
FIG. 10 is a schematic diagram of a copper hollow cylinder with screw threads on an inside wall of the cylinder according to the present invention.
Figure 12:
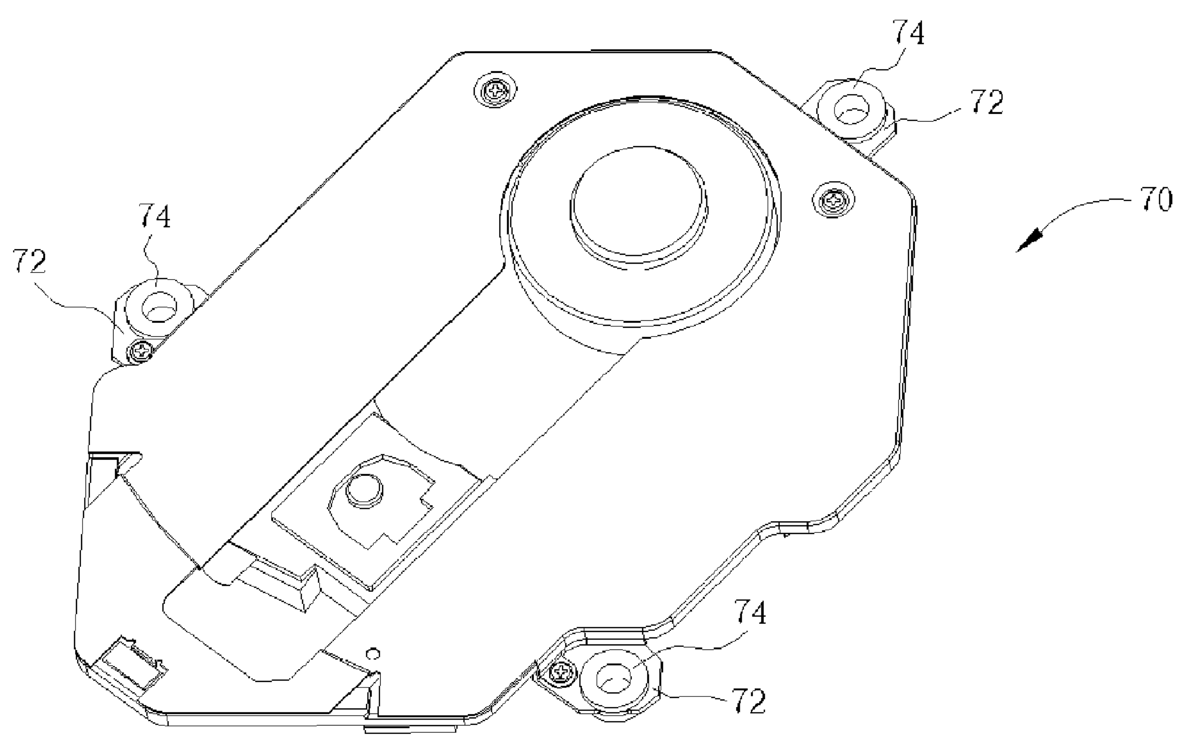
FIG. 12 is a schematic diagram of a portion of a main body of an optical disk drive using the dampers and corresponding through bores shown in FIG. 2 according to the present invention.

Please refer to FIG. 12. FIG. 12 is a schematic diagram of a portion of a main body of an optical disk drive using the dampers 24 and corresponding through bores shown in FIG. 2 according to the present invention. The main body of the optical disk drive comprises a mounting plate 70 having at least a notched base plate 72 with a through bore; a tray 80 (not shown in FIG. 12) the same as the tray 28 in FIG. 4 and further comprising a bore 82 having a structure of bore 32, such as the copper pillar in FIG. 9 or 10, for providing the functionality of bores 30 50 as to accept a screw; at least a damper 74 installed on the notched base plate 72; and at least a screw 36 (not shown in FIG. 12) combining with the damper 74, wherein a portion of the screw 36 is threaded into the bore 82 and the damper 74 elastically connects the mounting plate 70 with the screw 36.

Figure 13:
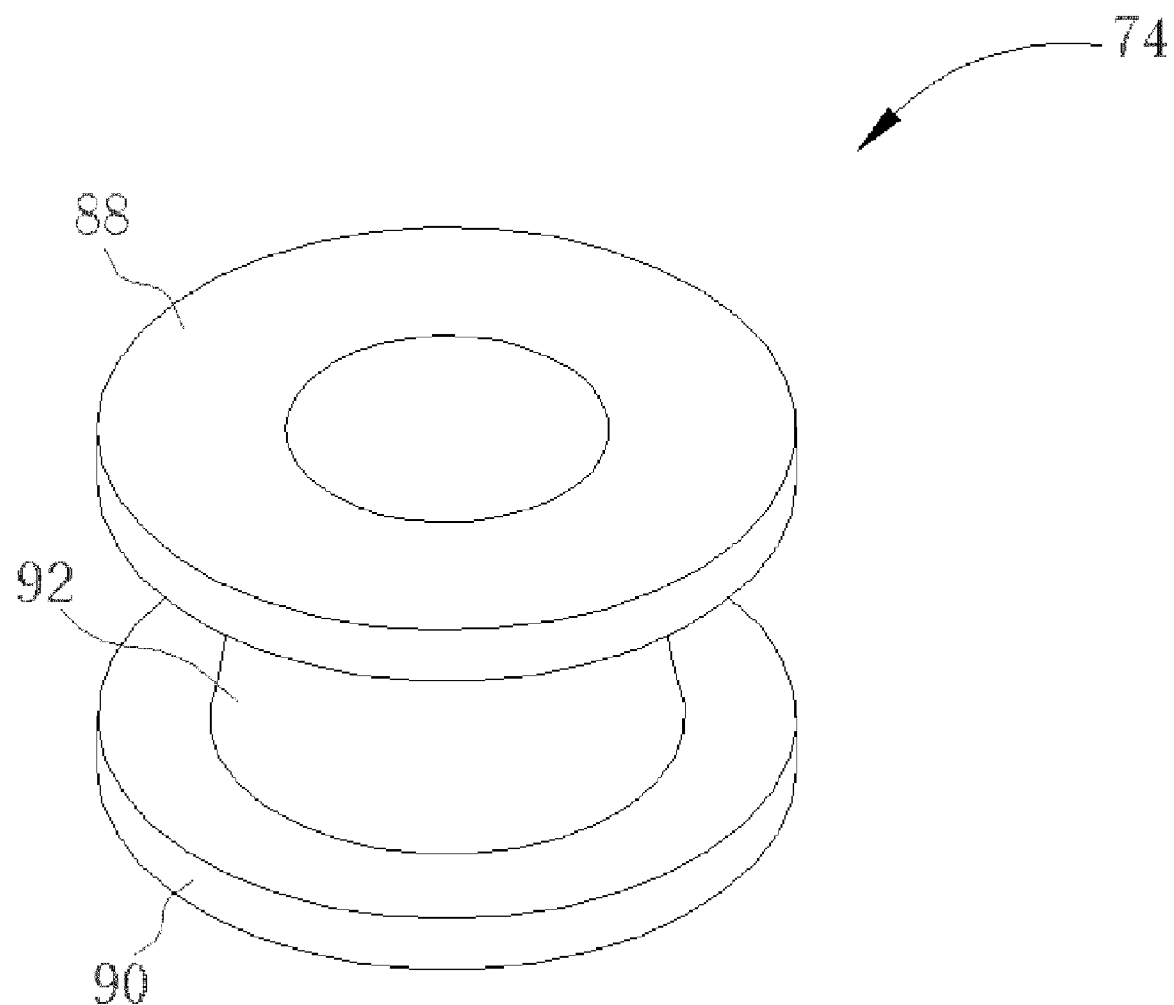
FIG. 13 is a schematic diagram of a damper according to the present invention.
Figure 14:
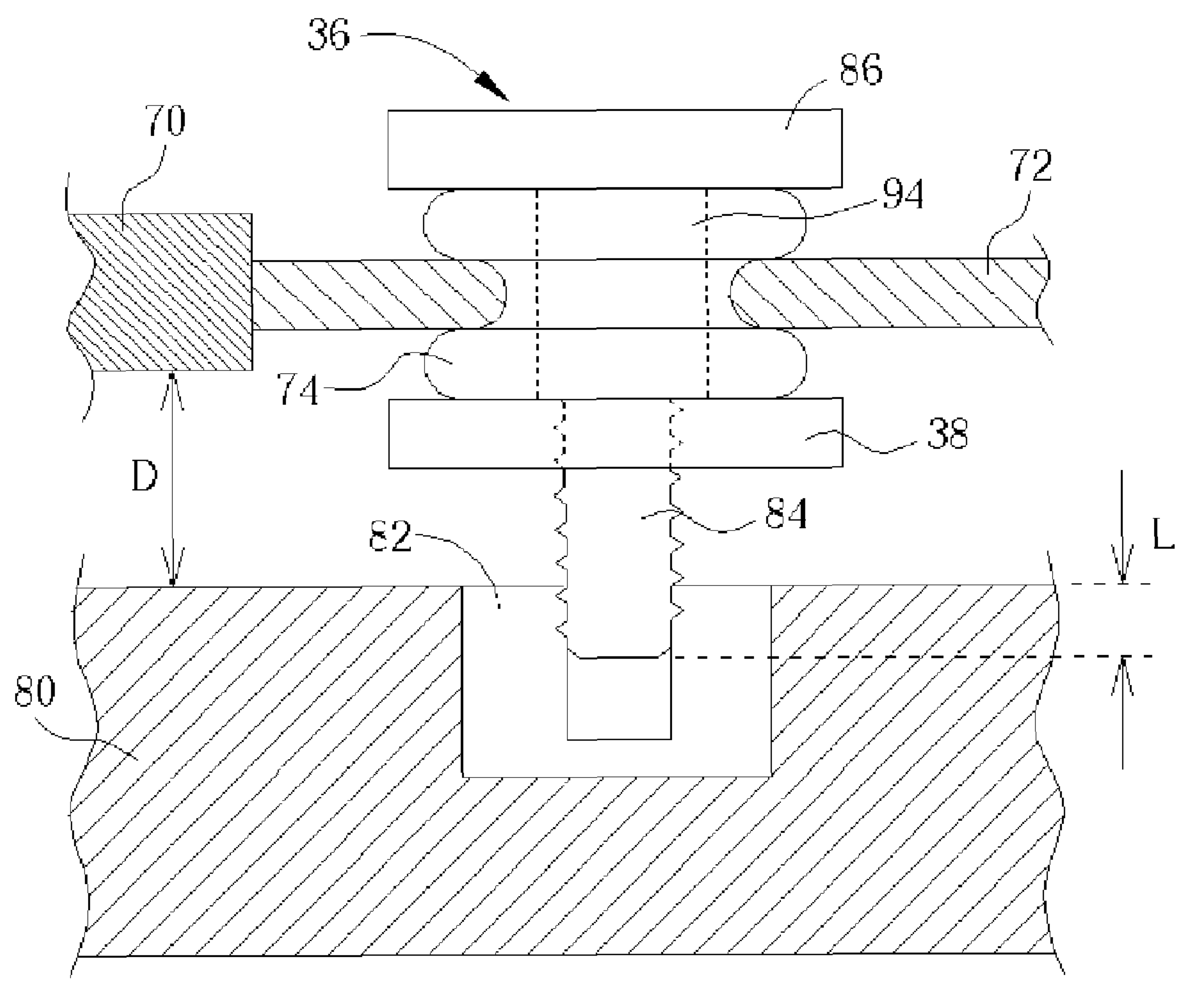
FIG. 14 is a schematic diagram of the position adjustment mechanism of the main body of the optical disk drive shown in FIG. 12 according to the present invention.

Please refer to FIG. 13. FIG. 13 is a schematic diagram of the damper 74. The damper 74 is cylindrical and comprises an upper large diameter portion 88 and a lower large diameter portion 90, wherein a space 92 between the upper and lower large diameter portions 88 and 90 has a smaller diameter. The damper 74 and the mounting plate 70 are combined on the space 92. The damper 74 also comprises a center hole for accepting a screw. The position adjustment mechanism further comprises a nut 38 shown in FIG. 14. The screw 36 comprises a shaft 84, a smooth portion 94, and a head 86. And the nut 38 of FIG. 14 is as same as the nut 38 in FIG. 8. The damper 74 is installed in the predetermined clearance between the head 86 and the nut 38. A glue layer can further be applied to the threads of the screws 36 to fix the depth of the screw 36 in the bore 82 if needed.

FIG. 14 is a schematic diagram of the position adjustment mechanism of the main body of the optical disk drive shown in FIG. 12 according to the present invention. The same as the position adjustment mechanism in FIG. 9, the mechanism contains a plurality of adjustment movements. The position adjustment mechanism comprises a plurality of bores 82 located in different position on the tray 80; a plurality of notched base plates 72 formed on the mounting plate 70 corresponding to the bores 82; a plurality of dampers 74 installed on the notched base plate 72; a plurality of the screws 36 installed through the center holes of the dampers 72 on the notched base plate 72 and the threaded in the bores 82 so as to fasten the mounting plate 70 to the tray 80; and a plurality of nuts 38 threaded to the corresponding screws 36 to fasten the screws 36 to the mounting plate 70. As shown in FIG. 14, the distance D can be adjusted by changing the depth L of the screw 36 in the bore 82.

Figure 15:
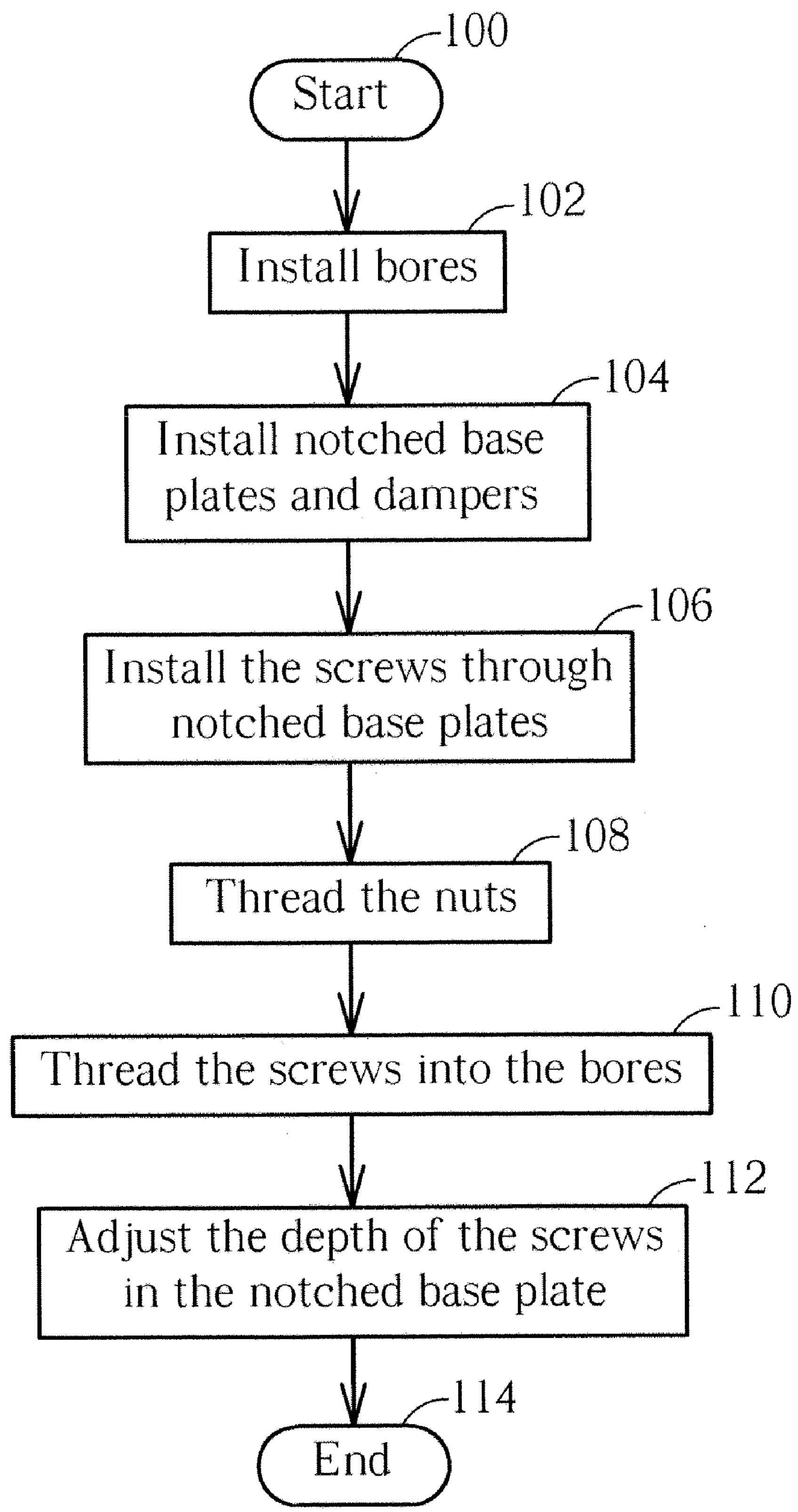
FIG. 15 is a flow chart of the position adjustment method using the position adjustment mechanism shown in FIG. 14.

Please refer to FIG. 15. FIG. 15 is a flow chart of the position adjustment method using the position adjustment mechanism shown in FIG. 14 according to the present invention. The method comprises the following steps:

Step 102: Install a plurality of bases bores 82 in the tray 80;

Step 104: Install a plurality of notched base plates 72 into the mounting plate 70 corresponding to the bores 82 in the tray 80 and assemble dampers 74 into the notched base plates 72;

Step 106: Install the screws 36 through the center holes of the dampers 74;

Step 108: Thread a plurality of nuts 38 onto the screws 36 to fasten the screws 36 to the mounting plate 70 and connect the screws 36 to the dampers 74;

Step 110: Thread the screws 36 into the corresponding bores 82 to fasten the mounting plate 70 to the tray 80;

Step 112: Adjust the depth of each of the screws 36 in the bore 82 to adjust the position of the mounting plate 70 relative to the tray 80;

Step 114: End.

In contrast to the prior art that uses tuning screws to adjust the height of the main guide bar and the sub guide bar to insure the sliding direction of the main body parallel with the optical disk surface, the present invention position adjustment mechanism and method is to adjust the depth of each of the screws in the bore of the tray to adjust the position of the mounting plate relative to the tray, so that the optical disk mounted on the mounting plate will not collide with the tray. The present invention has an especially preferable effect in application to a thin-type optical disk drive.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A mounting structure of an optical disk drive comprising:

a mounting plate comprising a notched base plate;

a tray comprising a bore;

a damper installed on the notched base plate;

a screw comprising a screw shaft and a head, the screw shaft comprising a first shaft section formed below the head and a second shaft section formed below the first shaft section, the second shaft section being threaded and having a smaller diameter than the first shaft section; and a nut dimensioned to be threaded onto the second shaft section;

wherein a bottom portion of the second shaft is threaded into the bore, and the nut is threaded onto the second shaft of the screw and is prevented from being threaded onto the first shaft section, the nut leaving a predetermined clearance between the head of the screw and the nut for installing the damper, and the damper elastically connecting the mounting plate to the screw;

wherein the screw is capable of being rotated in the bore to adjust a depth of the screw threaded into the bore to set a distance between the mounting plate and the tray.

2. The mounting structure of claim 1, wherein the bore is a copper pillar with an inside circular sidewall, the circular sidewall having screw threads for accepting the screw.

3. The mounting structure of claim 1, wherein the damper is cylindrical and comprises an upper large diameter portion and a lower large diameter portion, a space between the upper and lower large diameter portions having a smaller diameter for fitting into the notched base plate of the mounting plate.

4. The mounting structure of claim 1, wherein the screw further comprises a glue layer on the surface of the threads of the screws for fixing the depth of the screw in the bore.

* * * * *